2,867,609

PREPARATION OF POLYPYROMELLITIMIDES

Walter Murray Edwards, Ivan Maxwell Robinson, and Edward Noonan Squire, Wilmington, Del., assignors to E. I. du Pont de Nemours and Company, Wilmington, Del., a corporation of Delaware No Drawing. Application June 13, 1955
Serial No. 515,246

5 Claims. (Cl. 260—78)

This invention relates to the preparation of polypyromellitimides and more particularly to a process for the preparation of high-molecular-weight polypyromellitimides.

It is disclosed in the copending application of Edwards and Robinson Serial No. 515,245, filed on even date herewith, that certain compounds are especially suitable for the preparation of polypyromellitimides of improved tractability. These compounds are organic salts consisting essentially of substantially equimolar amounts of (a) a basic component selected from the group consisting of difunctional diprimary diamines and mixtures thereof and (b) an acidic component selected from the group consisting of temporarily difunctional pyromellitic diacid diesters in which the ester groups are attached to non-adjacent carbon atoms, and mixtures thereof. The present invention is concerned with the conversion of such salts into high-molecular-weight polypyromellitimides.

It is a general object of the present invention to provide a novel process for the preparation of high-molecular-weight polypyromellitimides. A further object is to provide a process for the preparation of high-molecular-weight polypyromellitimides wherein the removal of condensation by-products from the polymerizing mass is greatly facilitated. An additional object is to provide a process for rapidly increasing the molecular weight of polypyromellitimides. Other objects will be apparent hereinafter.

According to the present invention these objects are achieved by a process which comprises heating a finely divided salt of the aforesaid description in the solid state with removal of volatiles until a low-molecular-weight granular solid-stage condensation product having an inherent viscosity of at least 0.04 is obtained, and thereafter further heating the resulting product until a high-molecular-weight polypyromellitimide, having an inherent viscosity of at least 0.4 is obtained. By this procedure substantially all of the condensation by-products are eliminated during the initial heating stage, and the preparation of bubble-free final products is made relatively easy. In a more specific embodiment of the invention, a low-molecular-weight solid-stage condensation product prepared as just described is substantially instantaneously transformed into a high-molecular-weight polypyromellitimide by rapidly heating it to a temperature above its melting point and above 300° C.

The acidic components of the salts used in the process of the present invention are conveniently obtained by dissolving pyromellitic anhydride in an anhydrous alcohol such as methanol, ethanol or propanol. The salts themselves are readily prepared by admixing the basic component with the alcoholic solution of the acidic component and gently warming the mixture as necessary to form a homogeneous solution. The salt may be isolated in powder form either by recrystallizing or by evaporating the solvent at temperatures below about 100° C. Preferably the salt-forming step is conducted in the absence of oxygen. Advantageously a slight excess of the acidic component, for example from 0.1 to 2.5 mole percent, may be used to serve as a molecular weight regulator. Other adjuvants may also be incorporated into the solution or admixed with the dry powder, as for example heat stabilizers, color stabilizers, dispersing agents, anti-foam agents, pigments, and fillers of various kinds such as finely divided carbon, silica, glass, and the like.

Low-molecular-weight solid-stage condensation products are obtained by heating the dry salt or salt-adjuvant mixture at moderate temperatures insufficient to cause melting, ordinarily above 100° C. but below 200° C., and preferably in the range of 135 to 155° C., with removal of volatiles, until the inherent viscosity attains a value in the range of from 0.04 to 0.4. The heating may be carried out in various ways, as for example by means of a circulating air oven or by passing a stream of hot dry nitrogen through the particulate mass. Inherent viscosities may be determined by dissolving a sample of the product at a concentration of 0.5 gram per 100 cc. of solution in meta-cresol determining the viscosity of the solution and the viscosity of the solvent in efflux seconds at 25° C., dividing the viscosity of the solution by the viscosity of the solvent to obtain a relative viscosity, and taking the natural log of the relative viscosity and dividing it by 0.5 to find inherent viscosity.

The low-molecular-weight solid-stage condensation products may be converted into high-molecular-weight polypyromellitimides either by further heating in the solid state, or by further heating in the molten state, choice of method depending on the circumstances. In general the solid-stage condensation will be continued where it is desired to obtain the final high-molecular-weight polymer in granular form, as in the manufacture of molding powder. In such cases both the initial and final heating are conveniently carried out in the presence of an inert diluent, ordinarily at a temperature a few degrees below the melting point of the material being heated. Where it is desired to obtain the high-molecular-weight final product in massive coalesced form, the flash-melting procedure may be used. This procedure is especially useful in the production of thin final articles of polypyromellitimides which are either high-melting or otherwise difficult to fabricate because of their very high melt viscosity when fully polymerized. The flash-melting procedure involves rapidly heating the low-molecular-weight solid-stage condensation products at temperatures above their melting points and above 300° C., and effects an almost instantaneous transformation to high-molecular-weight products, having an inherent viscosity of at least 0.4, the actual time required being governed by the rate at which heating can be carried out, and the rate at which the molten product can be effectively cooled. The heating may be done in various ways. A convenient method involves pressing a thin layer of the low-molecular-weight solid-stage condensation product between heated platens. Alternatively, dielectric heating may be employed. Again, the powdered product may be fed into a blast of hot nitrogen and sprayed to form a coating, or forced through a heated orifice to form an extruded article.

The invention is more particularly described and explained by means of the following examples, which, however, are not intended as limitative.

*Example 1.*—Pyromellitic diacid diester is obtained by dissolving pyromellitic anhydride in refluxing absolute methanol. The resulting solution is cooled and 4,4-dimethylheptamethylenediamine in amount substantially equimolar with the dissolved dimethyl pyromellitate is admixed under nitrogen to form a homogeneous solution of the diacid diester/diamine salt. The excess alcohol is removed by evaporation at a temperature below 100° C. to obtain the salt in dry powder form. The dry salt is heated in a stream of nitrogen at 140° C. for an hour to obtain a low-molecular-weight solid-stage condensation product having an inherent viscosity of 0.04. The low-molecular-weight solid-stage condensation product is then gently pressed between hot platens at a temperature of 350° C. for two minutes and then cooled to below 100° C. during about 3 minutes. The product is a tough, cold-drawable, cream-colored film which is free of voids, completely soluble in meta-cresol, and manifests an inherent viscosity of 0.7.

*Example II.*—A low-molecular-weight solid-stage condensation product obtained as in Example I is further heated in a stream of nitrogen at a temperature of 200° C. for two hours, during which time it remains in the solid state. The product is a white granular material having an inherent viscosity of 0.8 which is injection molded at 360° C. to form a tough, void-free article.

*Example III.*—To a solution of diethyl pyromellitate obtained by dissolving pyromellitic anhydride in absolute ethanol is added an equimolar amount of nonamethylene diamine, and the excess alcohol is evaporated from the resulting solution to obtain the diacid diester/diamine salt in powder form. The dry salt is heated in the solid state for one hour at 145° C. under nitrogen to obtain a low-molecular-weight solid state condensation product having an inherent viscosity of 0.1. The resulting product is pressed between hot platens at 400° C. for 3 minutes and quenched in water to obtain a thin cream-colored void-free film which is completely soluble in meta-cresol and manifests an inherent viscosity of 1.80.

*Example IV.*—To a solution of diethyl pyromellitate obtained as in Example III is added an equimolar amount of 2,11-dodecanediamine, under nitrogen, and the excess alcohol evaporated at low temperature from the resulting solution to obtain the diacid diester/diamine salt in powder form. The diamide diester/diamine salt is heated for one hour in the solid state at 139° C. under a nitrogen sweep to obtain a low molecular-weight solid-stage condensation product having an inherent viscosity of 0.1, which is then pressed at 325° C. between heated platens for two minutes and cooled in air to yield a thin, cream-colored film, substantially free of voids, completely soluble in meta-cresol, having an inherent viscosity of 0.8.

In a companion experiment, in which the salt solution was dried and heated rapidly to 325° C., a stiff foamed mass is obtained.

*Example V.*—The powdered diacid diester salt of decamethylene diamine obtained by the procedure of Example III, is heated under a nitrogen sweep in the solid state at 145° C. for one hour and then at 196° C. for one hour, to obtain a low-molecular-weight solid-stage condensation product having an inherent viscosity of 0.3. This product is pressed for two minutes at 390° C. and quenched in water to yield a thin void-free, tan-colored, cresol-soluble film having an inherent viscosity of 1.0.

*Example VI.*—The powdered diacid diester salt of 1,2-bis-(3-aminopropoxy)-ethane is prepared by the procedure of Example III and heated under a nitrogen sweep in the solid state at 139° C. for one hour to yield a low-molecular-weight solid-state condensation product having an inherent viscosity of 0.1. The resulting product is pressed for two minutes at 325° C. and quenched in water to yield a thin, tan-colored, void-free, cresol-soluble film having an inherent viscosity of 0.8.

*Example VII.*—The powdered diacid diester salt of 4,4-dimethylheptamethylenediamine obtained by the procedure of Example III is heated for one hour at 139° C. and then further heated in the solid state for one hour at 196° C. under a nitrogen sweep to obtain a low-molecular-weight solid-stage condensation product having an inherent viscosity of 0.3. The resulting granular product is screw-extruded through a cylinder having a pipe-forming die at its exit end, the portion of the cylinder behind the die being held at 200° C. and the exit end being held at 360° C. and the extrudate quenched in water to form an extruded pipe having a ⅛ inch thick wall and a ½ inch internal diameter. The pipe is tough, tan-colored and substantially free of voids. A sample is soluble in meta-cresol and manifests an inherent viscosity of 0.9. The pipe is not affected by continued exposure to wet stream.

*Example VIII.*—The powdered diacid diester salt of 4,4-dimethylheptamethylenediamine obtained by the procedure of Example III is heated under a nitrogen stream in the solid state for three hours at gradually increasing temperatures up to 250° C. to obtain a granular product having an inherent viscosity of 0.95. The powder is charged to a screw extruder maintained at a temperature of 360° C., extruded through a 50 mil orifice, hot-drawn to a diameter of 20 mils, and quenched in water. The resulting monofil was further drawn at 75° C. at a draw ratio of 3.2 to 1 to obtain a tough, strong, cream-colored bristle which is unaffected by boiling water and manifests exceptional bend-recovery.

The high-molecular-weight polypyromellitimides prepared by the process of the present invention are especially useful in the form of pipe for food processing, bristles, gears, bearings, molded mechanical parts, power-cable sheaths, appliance-wire coverings, communication-wire coverings, magnet-wire coverings, blanket-wire coverings, electrically insulating films, capacitor insulator slot wedges, coil-forms, reinforced plastic compositions, and the like.

We claim:

1. A process for the preparation of high-molecular-weight polypyromellitimides which comprises heating a finely divided polypyromellitimide-forming salt in the solid state with removal of volatiles until a solid-stage condensation product having an inherent viscosity of at least 0.04 is obtained, and thereafter further heating the resulting product until a polypyromellitimide, having an inherent viscosity of at least 0.4, is obtained, said polypyromellitimide-forming salt consisting essentially of substantially equimolar amounts of (a) a basic component selected from the group consisting of difunctional diprimary diamines and mixtures thereof and (b) an acidic component selected from the group consisting of pyromellitic diacid diesters in which the esterified carboxyl groups are attached to non-adjacent carbon atoms, and mixtures thereof, said inherent viscosity being measured at 0.5% concentration in meta-cresol at 25° C.

2. Process of claim 1 wherein the said basic component is 4,4-dimethylheptamethylenediamine.

3. A process for the preparation of high-molecular-weight polypyromellitimides which comprises heating a finely divided polypyromellitimide-forming salt in the solid state with removal of volatiles until a solid-stage condensation product having an inherent viscosity in the range of 0.04 to 0.4 is obtained, and thereafter heating the resultant product to a temperature above its melting point and above 300° C., said polypyromellitimide-forming salt consisting essentially of a basic component selected from the group consisting of substantially equimolar amounts of (a) a basic component selected from the group consisting of difunctional diprimary diamines and mixtures thereof and (b) an acidic component selected from the group consisting of pyromellitic diacid diesters in which the esterified carboxyl groups are attached to non-adjacent carbon atoms, and mixtures thereof, said inherent viscosity being measured at 0.5% concentration in meta-cresol at 25° C.

4. Process of claim 2 wherein the said basic component is 4,4-dimethylheptamethylenediamine.

5. In a process for the preparation of high-molecular-weight polypyromellitimide articles the steps which comprise preliminarily heating a finely-divided polypyromellitimide-forming salt in the solid state with removal of volatiles until a solid-stage condensation product having an inherent viscosity, as measured at 0.5% concentration in meta-cresol at 25° C., in the range of 0.04 to 0.4 is obtained, thereafter rapidly heating the resultant product under pressure to a temperature above its melting point and above 300° C., whereby a shaped massive molten polypyromellitimide product having an inherent viscosity of at least 0.4, as measured at 0.5% concentration in meta-cresol at 25° C., is substantially instantaneously obtained, and subsequently cooling said shaped mass to the solid state, said polypyromellitimide-forming salt being one consisting essentially of substantially equimolar amounts of (a) a basic component selected from the group consisting of difunctional diprimary diamines and mixtures thereof, and (b) an acidic component selected from the group consisting of pyromellitic diacid diesters in which the esterified carboxyl groups are attached to non-adjacent carbon atoms, and mixtures thereof.

References Cited in the file of this patent

UNITED STATES PATENTS

| | | |
|---|---|---|
| 2,172,274 | Flory | Sept. 12, 1934 |
| 2,710,853 | Edwards et al. | June 14, 1955 |